United States Patent
Burchard et al.

(10) Patent No.: US 9,306,639 B2
(45) Date of Patent: Apr. 5, 2016

(54) COOPERATIVE ANTENNA-DIVERSITY RADIO RECEIVER

(71) Applicant: NXP B.V., Eindhoven (NL)

(72) Inventors: Artur Tadeusz Burchard, Eindhoven (NL); Alessio Filippi, Eindhoven (NL); Hong Li, Eindhoven (NL); Arie Geert Cornelis Koppelaar, Eindhoven (NL)

(73) Assignee: NXP, B.V., Eindhoven (NL)

( * ) Notice: Subject to any disclaimer, the term of this patent is extended or adjusted under 35 U.S.C. 154(b) by 0 days.

(21) Appl. No.: 14/445,861

(22) Filed: Jul. 29, 2014

(65) Prior Publication Data

US 2016/0036499 A1 Feb. 4, 2016

(51) Int. Cl.
*H04B 7/02* (2006.01)
*H04L 1/02* (2006.01)
*H04B 7/08* (2006.01)

(52) U.S. Cl.
CPC . *H04B 7/026* (2013.01); *H04B 7/08* (2013.01)

(58) Field of Classification Search
CPC .... H04B 3/36; H04B 7/15542; H04B 7/0845; H04B 7/0854; H04B 7/0857; H04L 25/20; H04L 12/44; H04L 12/46; H04L 25/0266; H04L 7/033; H04L 25/06; H04L 5/023; H04L 1/06; H04L 27/2647; H04M 11/06
USPC .............. 375/211–215, 219–223, 259–285, 375/295–352
See application file for complete search history.

(56) References Cited

U.S. PATENT DOCUMENTS

| | | | |
|---|---|---|---|
| 2010/0182916 A1 | 7/2010 | Drewes et al. | |
| 2010/0234071 A1* | 9/2010 | Shabtay et al. | 455/562.1 |
| 2010/0255772 A1* | 10/2010 | Hellman | 455/3.06 |
| 2011/0044379 A1 | 2/2011 | Lilleberg et al. | |
| 2011/0176477 A1 | 7/2011 | Lee et al. | |
| 2013/0215860 A1 | 8/2013 | Cho et al. | |
| 2014/0045541 A1* | 2/2014 | Moshfeghi | 455/500 |
| 2014/0148093 A1 | 5/2014 | Nguyen et al. | |
| 2015/0198457 A1* | 7/2015 | Nagy et al. | 701/431 |

OTHER PUBLICATIONS

J.N. Laneman, et al., "Cooperative Diversity in Wireless Networks: Efficient Protocols and Outage Behavior", vol. 50, No. 2, Dec. 2004, 3062-3080.
A distributed radio system; Application and figures for 81544336EP01.
Extended European Search Report for application No. 15178127.5 (Nov. 9, 2015).

* cited by examiner

*Primary Examiner* — James M Perez (57) ABSTRACT

Various exemplary embodiments relate to a wireless communications system related method and vehicle including: a first communications device configured for attachment to a vehicle including: a first antenna group, a first receiver configured to receive a first instance of a message via the first antenna group, a first transmitter configured to transmit a second instance of the message via the first antenna group, and a first controller configured to cause transmission of the second instance via the first transmitter in response to the first receiver receiving the first instance; and a second communications device configured for attachment to the vehicle including: a second antenna group, a second receiver configured to receive data via the second antenna group, wherein the second receiver receives both the first instance and the second instance, and message combination circuitry configured to generate combined message by combining the first instance and the second instance.

20 Claims, 3 Drawing Sheets

COOPERATIVE ANTENNA-DIVERSITY RADIO RECEIVER

TECHNICAL FIELD

Various exemplary embodiments disclosed herein relate generally to wireless communications and, more particularly but not exclusively, to wireless communication in intelligent transportation systems (ITS).

BACKGROUND

Intelligent transportation systems (ITS) are emerging for improving road safety by broadcasting real-time information regarding vehicles in the area. According to some ITSs, vehicles set-up a vehicular ad-hoc network (VANET) based on IEEE 802.11p dedicated short-range communications (DSRC) to wirelessly exchange position, speed, road condition, or event/accident information between nearby vehicles. In some applications, such as implementations according to the European Telecommunications Standards Institute (ETSI) ITS standards, vehicles periodically broadcast common awareness messages (CAMs) at a rate of 10 Hz to report information such as current speed and position in the control channel. Radio reception quality is important for such systems and safety-related applications.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts which will follow in later sections.

Various embodiments described herein relate to a vehicle communications system including: a first communications device configured for attachment to a vehicle including: a first antenna group including at least one antenna, a first receiver circuit configured to receive a first instance of a message via the first antenna group, a first transmitter circuit configured to transmit a second instance of the message via the first antenna group, and a first controller configured to cause transmission of the second instance of the message via the first transmitter circuit in response to the first receiver circuit receiving the first instance of the message; and a second communications device configured for attachment to the vehicle including: a second antenna group including at least one antenna, a second receiver circuit configured to receive data via the second antenna group, wherein the second receiver circuit receives both the first instance of the message and the second instance of the message, and message combination circuitry configured to generate a combined message by combining the first instance of the message and the second instance of the message.

Various embodiments are described wherein second receiver circuit is configured to receive the first instance of the message according to a first modulation scheme and to receive the second instance of the message according to a second modulation scheme, wherein the second modulation scheme has a higher bitrate than the first modulation scheme.

Various embodiments are described wherein the second communications device further includes a demodulator that demodulates both the first instance of the message and the second instance of the message prior to the message combination circuitry generating the combined of the message.

Various embodiments are described wherein the demodulation performed by the demodulator is a partial demodulation.

Various embodiments are described wherein the first communications device further includes: a decoder that decodes the first instance of the message after receipt to create a decoded message; and an encoder that encodes the decoded message to create the second instance of the message.

Various embodiments additionally include a third communications device configured for attachment to the vehicle including: a third antenna group including at least one antenna, a third receiver circuit configured to receive a first instance of a message via the third antenna group, a second transmitter circuit configured to transmit a third instance of the message via the third antenna group, and a second controller configured to cause transmission of the third instance of the message via the second transmitter circuit in response to the third receiver circuit receiving the first instance of the message, wherein the second receiver circuit further receives the third instance of the message and the message combination circuitry configured to generate combined message is further configured to generate the combined message by combining the first instance of the message, the second instance of the message, and the third instance of the message.

Various embodiments are described wherein the second communications device further includes a second controller configured to implement an intelligent transportation system application.

Various embodiments are described wherein the first controller is further configured to: determine a current congestion of a wireless medium accessible via the first antenna group; and refrain from causing the transmission of the second instance of the message when the current congestion exceeds a threshold.

Various embodiments are described wherein: the first controller is configured to cause transmission of the second instance of the message during a time-division multiple access (TDMA) slot associated with the first communications device, and the message combination circuitry of the second communications device is configured to combine the first instance of the message and the second instance of the message based on receiving the first instance of the message and subsequently receiving the second instance of the message during the TDMA slot associated with the first communications device.

Various embodiments are described wherein: the first receiver circuit and the second receiver circuit are configured to receive the first instance of the message via a first wireless channel, and the first controller is configured to cause transmission of the second instance of the message to the second communications device via a second wireless channel that is different from the first wireless channel.

Various embodiments are described wherein: the first receiver circuit and the second receiver circuit are configured to receive the first instance of the message via a first radio technology, and the first controller is configured to cause transmission of the second instance of the message to the second communications device via a second radio technology that is different from the first radio technology.

Various embodiments are described wherein the first controller is configured to perform a compression operation on the first instance of the message to create the second instance of the message.

Various embodiments are described wherein the first controller is configured to summarize the contents of the first instance of the message to create the second instance of the message.

Various embodiments described herein relate to a method performed by a vehicle communications system for receiving a message, the method including: receiving, by a slave transceiver mounted to a first vehicle and via a wireless communications medium, a first version of a message; transmitting, by the slave transceiver and via the wireless communications medium, a second version of the message; receiving, by a master transceiver mounted to the first vehicle and via the wireless communications medium, the first version of the message; receiving, by the master transceiver and via the wireless communications medium, the second version of the message; and combining the first version of the message and the second version of the message to produce a combined message.

Various embodiments additionally include utilizing the combined message by an intelligent transportation system application.

Various embodiments are described wherein the first version of the message is received by the master transceiver according to a first modulation scheme and the second version of the message is received by the master transceiver according to a second modulation scheme, wherein the second modulation scheme has a higher bitrate than the first modulation scheme.

Various embodiments additionally include receiving, by an additional slave transceiver mounted to the first vehicle and via the wireless communications medium, the first version of a message; transmitting, by the additional slave transceiver and via the wireless communications medium, a third version of the message; and receiving, by the master transceiver and via the wireless communications medium, the third version of the message, wherein combining the first version of the message and the second version of the message to produce the combined message includes combining the first version of the message, the second version of the message, and the third version of the message to produce the combined message.

Various embodiments additionally include receiving, by the slave transceiver via the wireless communications medium, a first version of a second message; receiving, by the master transceiver via the wireless communications medium, the first version of a second message; determining that the wireless communications medium is congested (for the retransmitting of the second version of the second message); and refraining from transmitting, by the slave transceiver, any second version of the second message based on the determination that the wireless communications medium is congested; utilizing the first version of the second message by an application of the vehicle communications system.

Various embodiments are described wherein transmitting, by the slave transceiver and via the wireless communications medium, the second version of the message includes transmitting the second version of the message according to a transmission parameter, wherein the transmission parameter is selected to be different from a reception parameter according to which the first version of the message is received by the master transceiver, and the transmission parameter is selected from the group consisting of: a time division multiple access (TDMA) slot, a wireless channel, and a radio technology.

Various embodiments described herein relate to a vehicle for participating in an intelligent transportation system (ITS), the vehicle including: a first communications device including: a first antenna group including at least one antenna, a first receiver circuit configured to receive original messages via the first antenna group, a first transmitter circuit configured to transmit duplicate messages via the first antenna group, and a first controller configured to cause transmission of the duplicate messages via the first transmitter circuit in response to the first receiver circuit receiving respective original messages; a second communications device including: a second antenna group including at least one antenna, a second receiver circuit configured to receive both the original messages and the duplicate messages, and message combination circuitry configured to generate combined messages by combining the original messages with respective duplicate messages; and a processor configured to implement an ITS application, wherein the ITS application utilizes the combined messages.

Various embodiments described herein relate to a non-transitory machine-readable storage medium encoded with instructions for execution by a wireless communications device, the medium including: instructions for receiving a first instance of a message via a wireless communications medium and receiver circuitry of the wireless communications device; instructions for receiving a second instance of the message via the wireless communications medium and the receiver circuitry, wherein the second instance of the message is received from a different wireless communications device from the wireless communications device, and wherein the wireless communications device and the different wireless communications device are commonly mounted on the same vehicle; instructions for combining the first instance of the message and the second instance of the message to generate a combined message.

Various embodiments additionally include instructions for associating the different wireless communications device with a reception characteristic, wherein the reception characteristic comprises at least one of a time division multiple access (TDMA) slot, a frequency division multiple access channel (FDMA), and a modulation scheme; wherein the instructions for receiving the second instance of the message comprise instructions for identifying the second instance of the message based on receiving the second instance according to the reception characteristic associated with the different wireless communications device.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure or substantially the same or similar function.

DETAILED DESCRIPTION

In highly mobile environments, such as ITS environments, radio reception quality can drop drastically at times due to doubly selective fading. Diversity techniques, such as antenna diversity, may be employed to improve radio reception quality in the case of such fading. Antenna diversity, in particular, improves reception quality by combining the signals received from two or more antennas. Effectiveness of this technique can be improved by disposing the multiple antennas sufficiently far apart from each other (e.g., by at least half the carrier wavelength) to provide for independent fading among the antennas. Even further separation is desirable to account for shadowing due to other factors such as a curved car roof. For example, one antenna may be disposed near the front of a vehicle and another antenna may be disposed near the rear of the vehicle.

Combination of signals is performed after the signals have been brought together. For example, in some environments, two antennas and associated transceivers may be in communications with each other via a coaxial cable, wired digital interface, or other wired connection. Such physical wiring, however, is relatively expensive. Accordingly, various embodiments described herein enable the reuse of a wireless communications medium to retransmit a received message from a slave transceiver to a master transceiver, where the two or more messages may be combined.

The description and drawings presented herein illustrate various principles. It will be appreciated that those skilled in the art will be able to devise various arrangements that, although not explicitly described or shown herein, embody these principles and are included within the scope of this disclosure. As used herein, the term, "or," as used herein, refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein.

Figure 1:
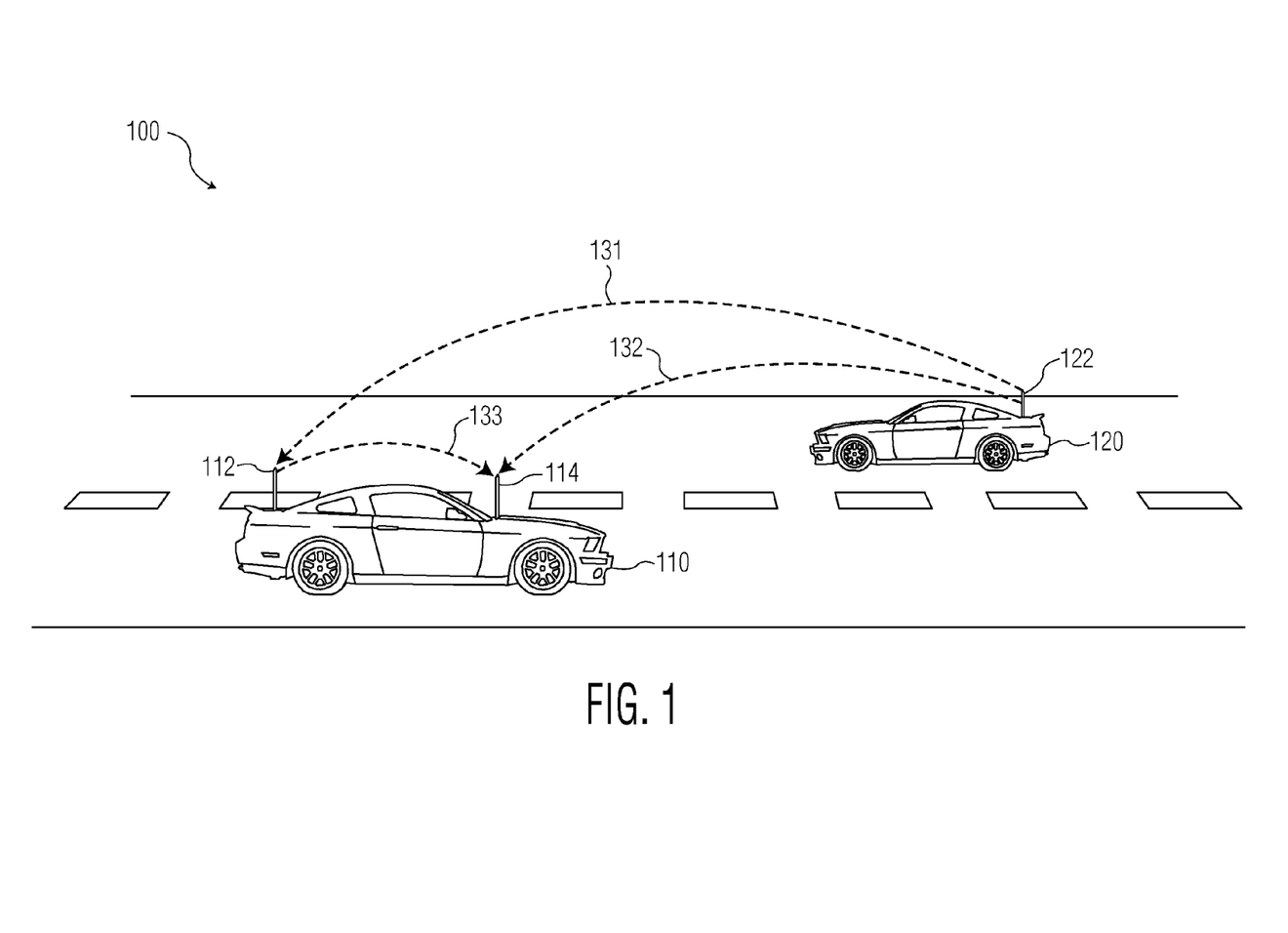
FIG. 1 illustrates an exemplary intelligent transportation system (ITS) environment for implementation of cooperative antenna diversity.

FIG. 1 illustrates an exemplary intelligent transportation system (ITS) environment 100 for implementation of cooperative antenna diversity. As shown, the ITS environment 100 includes two vehicles 110, 120 which are provided with a respective wireless communications devices 112, 114, 122 including one or more antenna and circuitry or other hardware for enabling communication between the vehicles 110, 120. It will be appreciated that fewer or greater number of vehicles may be present in the environment 100 and that diverse vehicles (e.g., cars, trucks, motorcycles, boats, aircraft, etc.) and other devices (e.g., mobile phones, pedestrian devices, roadside beacons, etc.) may participate in the environment 100 according to the various methods described herein.

According to various embodiments, the communications devices 112, 114, 122 periodically broadcast or otherwise exchange information with each other. For example, the communications devices 112, 122 may join a vehicular ad-hoc network (VANET) and periodically broadcast common awareness messages (CAMs) to be received by the other communications devices 112, 122 in the area. Such CAMs may include various information such as, for example, information identifying the current position and speed of the transmitting vehicle. Various additional or alternative messages for transmission between the vehicles 110, 120 will be apparent.

To increase received message quality against the prospect of fading, the first vehicle 110 implements an antenna diversity scheme. To provide antenna diversity, the first vehicle 110 includes a rear antenna 112 and a front antenna 114 that are associated with respective transceivers. Alternative antenna arrangements are also possible. As such, when the second vehicle 120 transmits a message, both the rear antenna 112 and the front antenna 114 receive respective copies 131, 132 of the message. Due to the positioning of the antennas 112, 114 of the first vehicle 110, the quality and fidelity of the received messages 131, 132 may vary and, as such, combination of the two messages 131, 132 may result in a better representation of the message as originally transmitted by the second vehicle 120.

The front antenna 114 may be associated with a master transceiver responsible for combining the messages, while the rear antenna 112 may be associated with a slave transceiver that forwards its received message to the master transceiver. After receiving the message 131 at the rear antenna 112, the slave transceiver then retransmits the message 133 for reception by the front antenna 114 and master transceiver. The master transceiver may then combine the received versions of the message 132, 133 to produce a combined message to be used by an ITS or other application.

Figure 2:
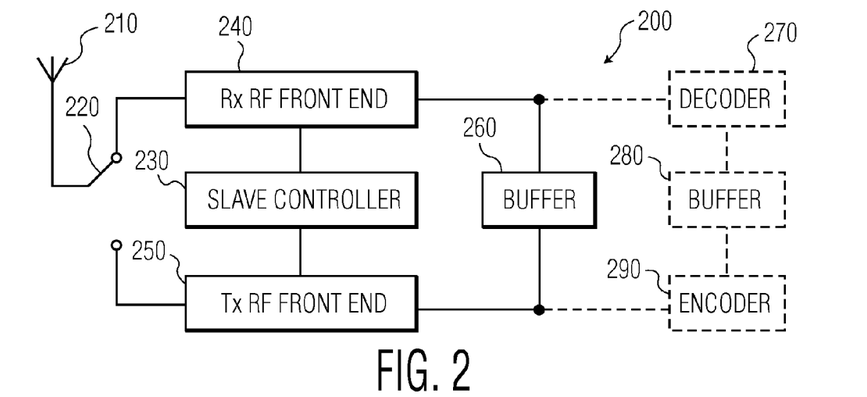
FIG. 2 illustrates a block diagram of an exemplary slave wireless communications device.

FIG. 2 illustrates a block diagram of an exemplary slave wireless communications device 200. The slave device 200 may be, for example, a slave transceiver and antenna 112 as installed in the exemplary vehicle 110 of FIG. 1. It will be apparent that various hardware configurations may be used to implement the components of the wireless communications device 200. For example, each component may be a separate circuit or integrated circuit (IC), multiple components may be implemented together as a single IC, or one or more components may be implemented by a microprocessor configured to perform the functions described herein. Various additional modifications will be apparent.

As shown, the slave device 200 includes an antenna 210 and an antenna switch 220 for selectively providing communication between the antenna 210 and either the transmit path or the receive path. The antenna switch 220 enables sequential re-transmission after receiving the first instance of a message, which may result in increased delay in the combined decoding. If the retransmission is in another channel or in another radio system, re-transmission can be in parallel to the receiving of the first instance. This may reduce the delay but require the use of two antennas. As such, in various alternative embodiments, the slave device 200 may include two or more antennas, with at least one antenna dedicated to the receive path and at least one other antenna dedicated to the transmit path. In such embodiments, the antenna switch 220 may be omitted.

A slave controller 230 may control the operation of the device 200 as will be described in greater detail below. For example, the slave controller 230 may control the antenna switch 220. In some embodiments, the slave controller 230 may also provide one or more applications such as, for example, an application that performs some functions associated with the ITS. In other embodiments, the slave controller may not perform any ITS functions which may, instead, be entirely provided by a separate master controller, an example of which will be described in greater detail below with respect to FIG. 3.

In the embodiment shown, the slave controller 230 is configured to monitor messages received by a receiver (Rx) radio frequency (RF) front end 240 and subsequently cause retransmission of such messages via the transmitter (Tx) RF front end 250. As will be understood, the Rx RF front end 240 and Tx RF front end 250 may include various circuitries for receiving and transmitting, respectively, messages via the antenna 210. For example, the Rx RF front end 240 and Tx RF front end 250 may include various amplifiers, filters, mixers, or oscillators configured and arranged to communicate signals via the antenna 210. Various options for implementing the Rx RF front end 240 and Tx RF front end 250 will be apparent to those of skill in the art.

The slave device 200 further includes a buffer 260, such as a memory device, for storing messages received by the Rx RF front end 240. Such messages may remain in the buffer 260 until retransmitted by the Tx RF front end 250. In various embodiments, the Tx RF front end 250 may be configured to transmit any messages stored in the buffer 260 without instruction or other intervention by the slave controller 230 or any other component. For example, in some such embodiments, the Tx RF front end 250 may simply transmit the next message stored in the buffer 260 (if any) whenever the antenna is available to the Tx RF front end 250, whenever a current time division multiple access (TDMA) slot is assigned to the slave device, or at another appropriate time. In some embodiments, the message stored in the buffer 260 is demodulated from the received signal. Upon transmission, the message is again modulated for wireless transmission, either according to the same modulation scheme as receiver or according to a different modulation scheme chosen for the short range transmission from slave to master device. In other embodiments, the message stored in the buffer 260 may be the received signal as modulated upon receipt. Then, the message is sent without any additional modulation.

In other embodiments, the slave controller 230 may direct the Tx RF front end 250 as to when a message should be retransmitted from the buffer 260. For example, the slave controller 230 may determine whether a message should be retransmitted or simply discarded from the buffer 260 based on a current congestion of the wireless medium. If some measure of congestion exceeds a predetermined threshold, the slave controller 230 may suppress retransmission of received messages, instead discarding such messages, until the medium becomes less congested. Alternatively, the slave controller 230 may change transmission options for the messages in periods of high congestions to, for example, utilize higher bandwidth modulations (e.g., various quadrature amplitude modulation (QAM) schemes), utilize alternate channels (different frequency division multiple access channels), or utilize alternative radio technology (e.g., ultra-wide band, direct sequence spread spectrum, or code division multiple access). In other embodiments, the slave controller 230 may direct the retransmission of messages according to such alternative modulation schemes, channels, or technologies by default and without regard for the congestion of the medium. For example, the Rx RF front end 240 may receive messages that are modulated according to a binary phase shift keying (BPSK) modulation scheme while the Tx RF front end 250 may retransmit such messages according to 16-QAM, thereby reducing load placed on the medium for the short-range retransmission to the master device. The receiving master device may then receive both messages according to the respective modulation schemes.

As noted, various methods may be employed to reduce the possibility of message collisions created by the retransmission of messages by the slave device 200. For example, TDMA, FDMA, or alternative radio technologies may be used for the retransmission of messages, either by default or during periods of high congestion. Further, the slave controller 230 may provide an adaptive method that monitors the congestion of the medium to reduce the number of messages that are retransmitted or completely disable message retransmission during periods of high congestion. As yet another method, the slave controller 230 may retransmit messages at a relatively low power. Various additional methods of reducing the likelihood of message collision will be apparent.

In various embodiments, the slave device 200 may decode and re-encode a received message prior to retransmission. As such, the slave device 200 may include a decoder 270 that fully or partially decodes the received message, an alternative or additional buffer 280 to store the decoded message, and an encoder 290 to re-encode the message prior to retransmission by the Tx RF front end 250. In some such embodiments, the encoder 290 may apply a different encoding scheme than was originally used to encode the message by the originating sender. Various hardware, such as circuitry or microprocessors, for implementing the decoder 270 and encoder 290 will be apparent.

Figure 3:
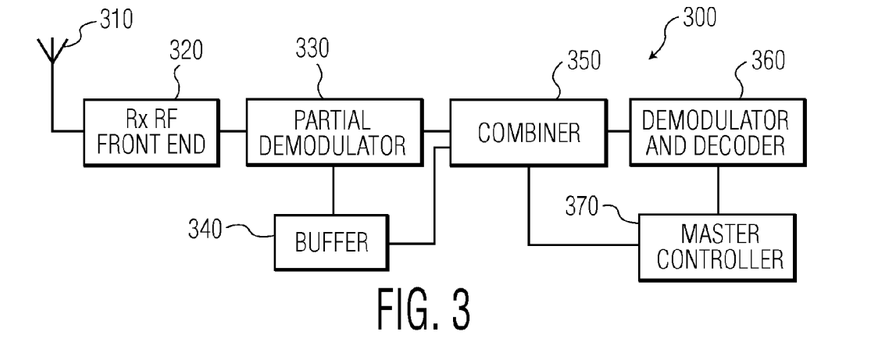
FIG. 3 illustrates a block diagram of an exemplary master wireless communications device.

FIG. 3 illustrates a block diagram of an exemplary master wireless communications device 300. The master device 300 may be, for example, a master transceiver and antenna 114 as installed in the exemplary vehicle 110 of FIG. 1. It will be apparent that various hardware configurations may be used to implement the components of the wireless communications device 300. For example, each component may be a separate circuit or integrated circuit (IC), multiple components may be implemented together as a single IC, or one or more components may be implemented by a microprocessor configured to perform the functions described herein. Various additional modifications will be apparent.

As shown, the master device 300 includes an antenna 310 attached to an Rx RF front end 320. It will be apparent that in various embodiments, the master device 300 may also include an antenna switch and Tx RF front end similar to the antenna switch 220 and Tx RF front end 250 of the exemplary slave device 200 of FIG. 2. As will be understood, the Rx RF front end 320 may include various circuitry for receiving messages via the antenna 310. For example, the Rx RF front end 320 may include various amplifiers, filters, mixers, or oscillators configured and arranged to receive signals via the antenna 310. Various options for implementing the Rx RF front end 320 will be apparent to those of skill in the art.

The Rx RF front end 320 passes received messages to a demodulator 330 that may fully or partially demodulate the received message. As shown the demodulator 330 is a partial demodulator that partially demodulates received messages. Upon decoding the message, the partial demodulator 330 either stores the message in a buffer 340 or provides the message to the combiner 350. For example, the partial demodulator 330 or another component (such as the master controller 370) may determine whether an additional version of the decoded message has yet to arrive or be processed. For example, if the master device 300 is expecting a slave device to retransmit the message (e.g., the master device 300 always expects such retransmission, the master device 300 has been notified by the slave device that it is currently in retransmission mode, or the master device has monitored the medium congestion and independently determined the system to be operating in retransmission mode) but has not received such a retransmitted message, the demodulator 330 stores the message in the buffer 340 to await the retransmitted message. If, on the other hand, the most recently demodulated message is a retransmitted message (e.g., the buffer 340 already stores a previously received and demodulated instance of the message), the demodulator 330 passes the message directly to the combiner 350. Various methods for differentiating between original and retransmitted messages, coordinating the combination of messages, and agreeing on the operation mode of the overall system will be apparent.

The combiner 350 includes hardware configured to combine two or more instances or versions of a message to produce a single combined message for use by the master device 300. The combiner 350 may utilize virtually any method for combining messages such as, for example, maximum ratio, equal ratio, or diversity packet combining. Upon producing a combined message, the combiner 350 passes the message to the demodulator and decoder 360 which operates to complete any demodulation not finished by the first demodulator 330 and to decode the combined message to produce a message that can be interpreted by a higher level application.

A master controller 370, such as a processor, is also provided to implement at least one higher level application. For example, the master controller may implement an ITS application that utilizes the fully decoded combined message produced by the demodulator/decoder 360. The master controller 370 may also direct the operation of the various other components of the master controller. For example, in various embodiments, the master controller 370 may be configured to monitor the medium or communicate with one or more slave controllers to determine whether the slave devices are currently retransmitting messages. Based on this determination, the master controller 370 may enable or disable the operation of the combiner 350, as appropriate. Additionally, the master controller 370 may assist in differentiating between original messages and retransmitted messages by, for example, monitoring the modulation scheme, reception channel, or reception radio technology for each received message. Various additional functions for the master controller 370 will be apparent.

In various embodiments, the slave device 200 and master device 300 may communicate to implement some control functions. For example, the slave device 200 and master device 300 may communicate to agree on what transmission properties should be set for each message retransmission or how frequently messages should be retransmitted (e.g., no messages, every message, every other message, etc.). In some embodiments, the slave device 200 and master device 300 may implement a calibration method for determining appropriate retransmission characteristics. For example, the slave device 200 may repeatedly transmit a calibration message at continual decreasing powers. Based on this transmission, the slave device 200 and master device 300 are able to agree on the lowest transmission power that can still be used to communicate between the two devices 200, 300. Various other control functions will be apparent.

In some embodiments, such as embodiments wherein retransmission and combination protocols are standardized, the slave device 200 may retransmit messages to master devices installed on different vehicles. Likewise, the master device 300 may utilize retransmitted messages from slave devices installed on other vehicles for purposes of combination. Such embodiments may utilize increased transmission power at the slave devices 200 such that retransmitted messages are able to reach master devices installed on nearby vehicles.

Figure 4:
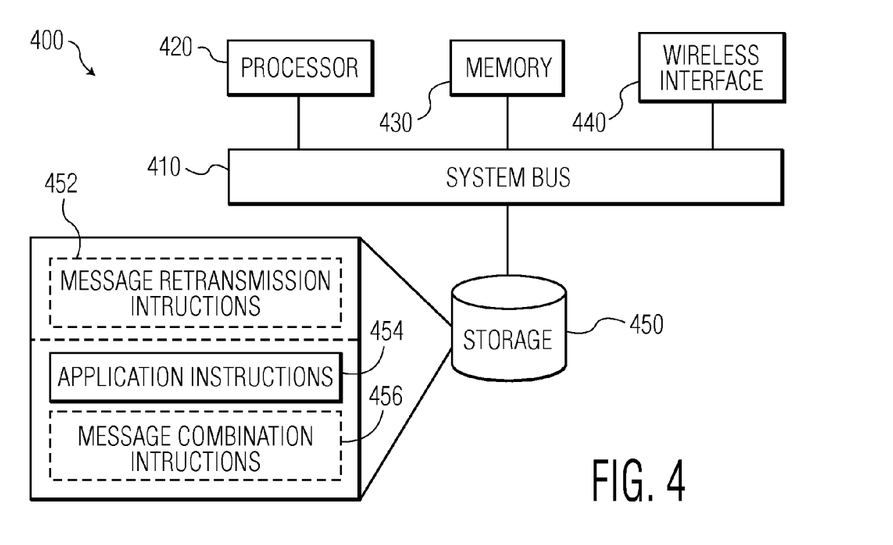
FIG. 4 illustrates a hardware diagram of an exemplary wireless communications device.

FIG. 4 illustrates a hardware diagram of an exemplary wireless communications device 400. The exemplary device 400 may correspond to the slave device 200 or the master device 300. As shown, the device 400 includes a processor 420, memory 430, wireless interface 440, and storage 450 interconnected via one or more system buses 410. It will be understood that FIG. 4 constitutes, in some respects, an abstraction and that the actual organization of the components of the device 400 may be more complex than illustrated.

The processor 420 may be any hardware device capable of executing instructions stored in the memory 430 or the storage 460. As such, the processor may include a microprocessor, field programmable gate array (FPGA), application-specific integrated circuit (ASIC), or other similar devices.

The memory 430 may include various memories such as, for example L1, L2, or L3 cache or system memory. As such, the memory 430 may include static random access memory (SRAM), dynamic RAM (DRAM), flash memory, read only memory (ROM), or other similar memory devices.

The wireless interface 440 may include one or more devices for enabling communication with other hardware devices via a wireless communications medium. For example, the wireless interface 440 may include one or more antennas, reception circuitry capable of signal demodulation according to various schemes, transmission circuitry capable of signal modulation according to various schemes, and one or more protocol stacks. In some embodiments, the wireless interface 440 includes various components of the slave communications device 200 or master communications device 300. Various alternative or additional hardware or configurations for the network interface 440 will be apparent.

The storage 450 may include one or more machine-readable storage media such as read-only memory (ROM), random-access memory (RAM), magnetic disk storage media, optical storage media, flash-memory devices, or similar storage media.

For example, where the hardware 400 implements a slave device, the storage 450 may store message retransmission instructions 452 for directing the operations of the various components to effect retransmission of received messages toward a master device. The message retransmission instructions 452 may include software for implementing various functions described above as being performed by the slave controller 230 or by the slave device 200 generally. Alternatively some or all of these functions may be performed partially or fully in hardware.

As another example, where the hardware 400 implements a master device, the storage 450 includes applications instructions for providing one or more applications to use the combined and decoded messages produced according to the methods and systems described herein. For example, the application instructions 454 may include instructions for implementing various features of an ITS. Further, the storage 450 may store message combination instructions 456 for directing the operations of the various components to effect combination of multiple messages for use by the application instructions. The message combination instructions 456 may include software for implementing various functions described above as being performed by the master controller 370 or by the master device 300 generally. Alternatively some or all of these functions may be performed partially or fully in hardware.

It will be apparent that various information described as stored in the storage 450 may be additionally or alternatively stored in the memory 430. In this respect, the memory 430 may also be considered to constitute a "storage device." Various other arrangements will be apparent. Further, the memory 430 and storage 450 may both be considered to be "non-transitory machine-readable media." As used herein, the term "non-transitory" will be understood to exclude transitory signals but to include all forms of storage, including both volatile and non-volatile memories.

While the device 400 is shown as including one of each described component, the various components may be duplicated in various embodiments. For example, the processor 420 may include multiple microprocessors that are configured to independently execute the methods described herein or are configured to perform steps or subroutines of the methods described herein such that the multiple processors cooperate to achieve the functionality described herein.

Figure 5:
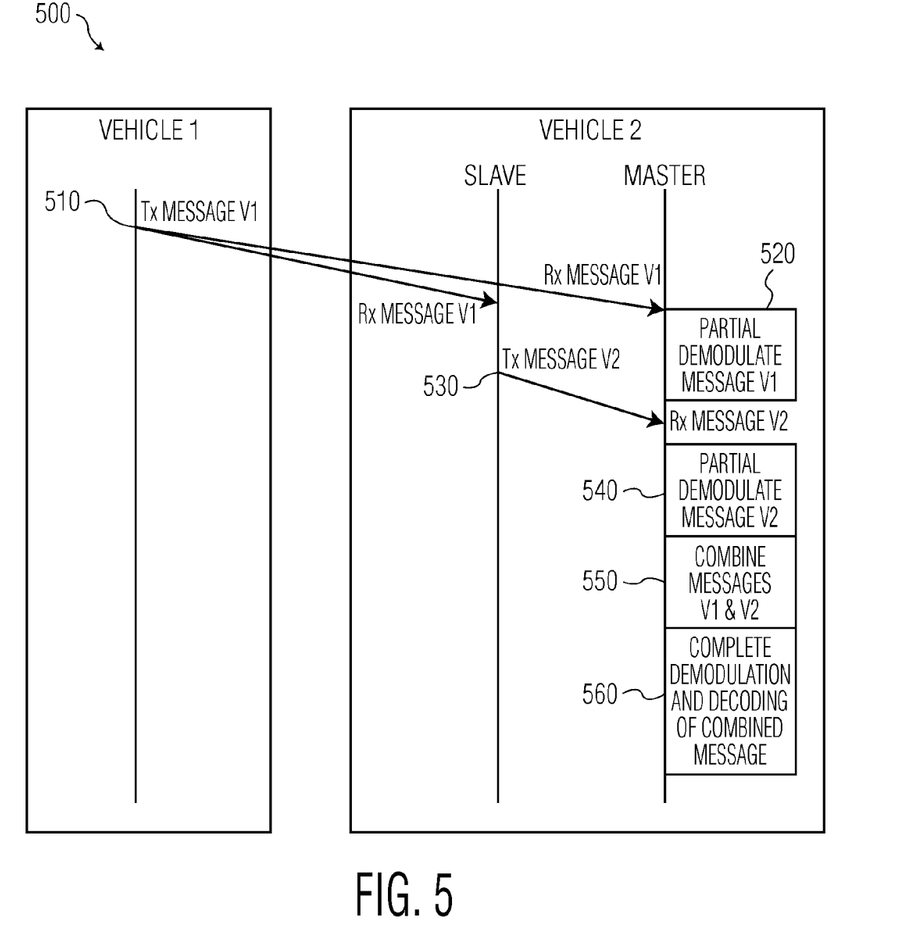
FIG. 5 illustrates an exemplary message exchange between two vehicles.

FIG. 5 illustrates an exemplary message exchange 500 between two vehicles. For example, the message exchange 500 may describe the message exchange illustrated in FIG. 1. The message exchange 500 begins when the first vehicle transmits 510 a message, which is received by both a slave device and a master device on the second vehicle. Upon receiving this message "V1," the master device performs a partial demodulation 520 of the message in anticipation of combining with a retransmitted message. At the same time, the slave device performs appropriate processing, if any, as described above and retransmits the message "V2," which is received at the master device. As with V1, the master device performs a partial demodulation 540 of V2. With both messages V1 and V2 partially demodulated (and assuming that the exemplary system in which the message exchange 500 occurs does not include any additional slave devices operating in conjunction with the master device of the second vehicle), the master device goes on to combine 550 the messages V1 and V2 to produce a combined message. For example, the master device may perform maximum ratio combining to produce the combined message. The master device then completes demodulation and decoding 560 on the combined message and is then able to use the now decoded message for any appropriate applications.

Various modifications to the above methods and systems will be apparent. For example, where multiple slave devices are used, appropriate coordination modifications will help avoid message collision and identification of appropriate messages for combination. For example, where three slave devices are used, a unique TDMA slot may be agreed on for each slave device. As another modification, the slave device may modify the message before retransmission. For example, the slave device could retransmit a summary of the received message or a compressed version of the received message that is uncompressed by the master device before combination with the uncompressed original message. For example, the slave device may transmit only half of the samples which are the strongest. Various additional modifications in view of the foregoing will be apparent.

According to the foregoing, various embodiments reduce the cost associated with implementing cooperative radio diversity in a vehicle and other environments. In particular, by retransmitting messages over a wireless medium from a slave antenna and device to a master antenna and device, the messages to be combined may be brought together at the master device without connecting the master and slave devices using a physical medium such as a cable. Various additional benefits will be apparent in view of the foregoing.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A vehicle communications system comprising:
a first communications device configured for attachment to a vehicle comprising:
a first antenna group comprising at least one antenna,
a first receiver circuit configured to receive a first instance of a message via the first antenna group,
a first transmitter circuit configured to transmit a second instance of the message via the first antenna group, and
a first controller configured to cause transmission of the second instance of the message via the first transmitter circuit in response to the first receiver circuit receiving the first instance of the message; and
a second communications device configured for attachment to the vehicle comprising:
a second antenna group comprising at least one antenna,
a second receiver circuit configured to receive data via the second antenna group, wherein the second receiver circuit receives both the first instance of the message and the second instance of the message, and
message combination circuitry configured to generate a combined message by combining the first instance of the message and the second instance of the message.

2. The vehicle communications system of claim 1, wherein second receiver circuit is configured to receive the first instance of the message according to a first modulation scheme and to receive the second instance of the message according to a second modulation scheme, wherein the second modulation scheme has a higher bitrate than the first modulation scheme.

3. The vehicle communications system of claim 1, wherein the second communications device further comprises a demodulator that demodulates both the first instance of the message and the second instance of the message prior to the message combination circuitry generating the combined message.

4. The vehicle communications system of claim 3, wherein the demodulation performed by the demodulator is a partial demodulation.

5. The vehicle communications system of claim 1, wherein the first communications device further comprises:
a decoder that decodes the first instance of the message after receipt to create a decoded message; and
an encoder that encodes the decoded message to create the second instance of the message.

6. The vehicle communications system of claim 1, further comprising:
a third communications device configured for attachment to the vehicle comprising:

a third antenna group comprising at least one antenna,
a third receiver circuit configured to receive a first instance of a message via the third antenna group,
a second transmitter circuit configured to transmit a third instance of the message via the third antenna group, and
a second controller configured to cause transmission of the third instance of the message via the second transmitter circuit in response to the third receiver circuit receiving the first instance of the message,
wherein the second receiver circuit further receives the third instance of the message and the message combination circuitry configured to generate combined message is further configured to generate the combined message by combining the first instance of the message, the second instance of the message, and the third instance of the message.

7. The vehicle communications system of claim 1, wherein the second communications device further comprises a second controller configured to implement an intelligent transportation system application.

8. The vehicle communications system of claim 1, wherein the first controller is further configured to:
determine a current congestion of a wireless medium accessible via the first antenna group; and
refrain from causing the transmission of the second instance of the message when the current congestion exceeds a threshold;
wherein the message combination circuitry is configured to not generate the combined message when the current congestion exceeds the threshold.

9. The vehicle communications system of claim 1, wherein:
the first controller is configured to cause transmission of the second instance of the message during a time-division multiple access (TDMA) slot associated with the first communications device, and
the message combination circuitry is configured to combine the first instance of the message and the second instance of the message based on receiving the first instance of the message and subsequently receiving the second instance of the message during the TDMA slot associated with the first communications device.

10. The vehicle communications system of claim 1, wherein:
the first receiver circuit and the second receiver circuit are configured to receive the first instance of the message via a first wireless channel, and
the first controller is configured to cause transmission of the second instance of the message to the second communications device via a second wireless channel that is different from the first wireless channel.

11. The vehicle communications system of claim 1, wherein:
the first receiver circuit and the second receiver circuit are configured to receive the first instance of the message via a first radio technology, and
the first controller is configured to cause transmission of the second instance of the message to the second communications device via a second radio technology that is different from the first radio technology.

12. The vehicle communications system of claim 1, wherein the first controller is configured to perform a compression operation on the first instance of the message to create the second instance of the message.

13. The vehicle communications system of claim 1, wherein the first controller is configured to summarize the contents of the first instance of the message to create the second instance of the message.

14. A method performed by a vehicle communications system for receiving a message, the method comprising:
receiving, by a slave transceiver mounted to a first vehicle and via a wireless communications medium, a first version of a message;
transmitting, by the slave transceiver and via the wireless communications medium, a second version of the message;
receiving, by a master transceiver mounted to the first vehicle and via the wireless communications medium, the first version of the message;
receiving, by the master transceiver and via the wireless communications medium, the second version of the message; and
combining the first version of the message and the second version of the message to produce a combined message.

15. The method of claim 14, further comprising: utilizing the combined message by an intelligent transportation system application.

16. The method of claim 14, further comprising:
receiving, by an additional slave transceiver mounted to the first vehicle and via the wireless communications medium, the first version of a message;
transmitting, by the additional slave transceiver and via the wireless communications medium, a third version of the message; and
receiving, by the master transceiver and via the wireless communications medium, the third version of the message,
wherein combining the first version of the message and the second version of the message to produce the combined message comprises combining the first version of the message, the second version of the message, and the third version of the message to produce the combined message.

17. The method of claim 14, further comprising:
receiving, by the slave transceiver via the wireless communications medium, a first version of a second message;
receiving, by the master transceiver via the wireless communications medium, the first version of the second message;
determining that the wireless communications medium is congested; and
refraining from transmitting, by the slave transceiver, any second version of the second message based on the determination that the wireless communications medium is congested;
utilizing the first version of the second message by an application of the vehicle communications system;
wherein combining further includes not combining the first version of the second message and the any second version of the second message when the wireless communications medium is congested.

18. The method of claim 14, wherein transmitting, by the slave transceiver and via the wireless communications medium, the second version of the message comprises transmitting the second version of the message according to a transmission parameter, wherein the transmission parameter is selected to be different from a reception parameter according to which the first version of the message is received by the master transceiver, and
the transmission parameter is selected from the group consisting of: a time division multiple access (TDMA) slot, a wireless channel, and a radio technology.

19. A non-transitory machine-readable storage medium encoded with instructions for execution by a wireless communications device, the storage medium comprising:
- instructions for receiving a first instance of a message via a wireless communications medium and receiver circuitry of the wireless communications device;
- instructions for receiving a second instance of the message via the wireless communications medium and the receiver circuitry, wherein the second instance of the message is received from a different wireless communications device from the wireless communications device, and wherein the wireless communications device and the different wireless communications device are commonly mounted on the same vehicle;
- instructions for combining the first instance of the message and the second instance of the message to generate a combined message.

20. The non-transitory machine-readable storage medium of claim 19, further comprising:
- instructions for associating the different wireless communications device with a reception characteristic, wherein the reception characteristic comprises at least one of a time division multiple access (TDMA) slot, a frequency division multiple access channel (FDMA), and a modulation scheme;
- wherein the instructions for receiving the second instance of the message comprise instructions for identifying the second instance of the message based on receiving the second instance according to the reception characteristic associated with the different wireless communications device.

* * * * *